United States Patent
Barbarin et al.

(10) Patent No.: US 11,192,403 B2
(45) Date of Patent: Dec. 7, 2021

(54) SIPED TREAD FOR OFF-ROAD TIRE

(71) Applicant: COMPAGNIE GENERALE DES ETABLISSEMENTS MICHELIN, Clermont-Ferrand (FR)

(72) Inventors: François Barbarin, Clermont-Ferrand (FR); Guillaume Demaziere, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 311 days.

(21) Appl. No.: 16/087,010

(22) PCT Filed: Mar. 14, 2017

(86) PCT No.: PCT/FR2017/050569
§ 371 (c)(1),
(2) Date: Sep. 20, 2018

(87) PCT Pub. No.: WO2017/162953
PCT Pub. Date: Sep. 28, 2017

(65) Prior Publication Data
US 2019/0100057 A1 Apr. 4, 2019

(30) Foreign Application Priority Data
Mar. 25, 2016 (FR) ..................... 16/52623

(51) Int. Cl.
*B60C 11/03* (2006.01)
*B60C 11/13* (2006.01)
(Continued)

(52) U.S. Cl.
CPC ............. *B60C 11/11* (2013.01); *B60C 11/033* (2013.01); *B60C 11/125* (2013.01);
(Continued)

(58) Field of Classification Search
CPC ............. B60C 11/1272; B60C 11/1281; B60C 2011/129; B60C 11/125; B60C 11/1392;
(Continued)

(56) References Cited

U.S. PATENT DOCUMENTS 6,527,024 B1* 3/2003 Ashmore ............ B60C 11/0316
152/209.22
2004/0211502 A1* 10/2004 Ono ........................ B60C 11/11
152/209.19
(Continued)

FOREIGN PATENT DOCUMENTS

EP 0 668 173 8/1995
EP 2 952 362 12/2015
(Continued)

OTHER PUBLICATIONS

Machine Translation: JP-2013163435-A, Ono, Hiroaki, (Year: 2020).*
(Continued)

*Primary Examiner* — Kendra Ly
(74) *Attorney, Agent, or Firm* — Cozen O'Connor

(57) ABSTRACT

Tread (10) for a tire of an off-road vehicle. Total width Wt of the tread is greater than 600 mm and has at least three circumferential main grooves (1, 2, 3, 4) at least 60 mm deep that divide the tread into intermediate ribs (51, 52, 53) and edge ribs (8). The edge ribs have a width≤0.25 Wt. At least one of the intermediate ribs (51, 52, 53) has fine grooves (61, 62, 63) of depth H1 delimiting blades of material (71, 72, 73) of mean width B1<2H1. Grooves (61, 62, 63) are oriented in the axial direction of the tire. Each intermediate rib (51, 52, 53) has a mean width≤0.25 Wt and ≥0.75 Ht (thickness of material to be worn away). Grooves, (61, 62, 63) have, over a height H12 at least equal to 65% of H1, a width≤ to the value obtained from $0.04\sqrt{B1 \cdot H1}$.

10 Claims, 2 Drawing Sheets

(51) Int. Cl.
*B60C 11/12* (2006.01)
*B60C 11/11* (2006.01)

(52) U.S. Cl.
CPC ....... *B60C 11/0306* (2013.01); *B60C 11/0311* (2013.01); *B60C 11/1218* (2013.01); *B60C 11/1259* (2013.01); *B60C 2011/036* (2013.01); *B60C 2011/0341* (2013.01); *B60C 2011/0344* (2013.01); *B60C 2011/0353* (2013.01); *B60C 2011/0365* (2013.01); *B60C 2200/06* (2013.01); *B60C 2200/065* (2013.01)

(58) Field of Classification Search
CPC ........... B60C 11/1384; B60C 2200/065; B60C 2200/14
See application file for complete search history.

(56) References Cited

U.S. PATENT DOCUMENTS

| | | | | |
|---|---|---|---|---|
| 2006/0269636 | A1* | 11/2006 | Miyamae | B60C 11/0306 425/35 |
| 2010/0006197 | A1* | 1/2010 | Kuroishi | B60C 11/0311 152/209.18 |
| 2011/0259494 | A1* | 10/2011 | Shibano | B60C 11/0309 152/209.22 |
| 2014/0053962 | A1* | 2/2014 | Lhospitalier | B60C 11/04 152/209.18 |
| 2015/0183274 | A1* | 7/2015 | Felder | B60C 11/032 152/209.25 |
| 2015/0352906 | A1* | 12/2015 | Nomura | B60C 11/0311 152/209.18 |
| 2018/0201070 | A1* | 7/2018 | Hasegawa | B60C 11/0302 |

FOREIGN PATENT DOCUMENTS

| | | | | | |
|---|---|---|---|---|---|
| JP | 2004262295 | A | * | 9/2004 | .......... B60C 11/0311 |
| JP | 2006160195 | A | * | 6/2006 | |
| JP | 2008013037 | A | * | 1/2008 | .......... B60C 11/0311 |
| JP | 2012179948 | A | * | 9/2012 | |
| JP | 2013163435 | A | * | 8/2013 | |
| JP | 2014234091 | A | * | 12/2014 | .......... B60C 11/0311 |
| WO | WO-2008056504 | A1 | * | 5/2008 | ............. B60C 11/01 |
| WO | WO 2015/197429 | | | 12/2015 | |

OTHER PUBLICATIONS

Machine Translation: JP-2006160195-A, Kojima, Hiroyuki, (Year: 2021).*
Machine Translation: JP-2004262295-A, Ono, Akira, (Year: 2021).*
Machine Translation: JP-2014234091-A, Koyanagi Jun, (Year: 2021).*
Machine Translation: WO-2008056504-A1, Yoda Hidetoshi, (Year: 2021).*
Machine Translation: JP-2008013037-A, Inoue, Takumi, (Year: 2021).*
Machine Translation: JP-2012179948-A, Nomura, Tsutomu, (Year: 2021).*

* cited by examiner

COUPE SELON II-II

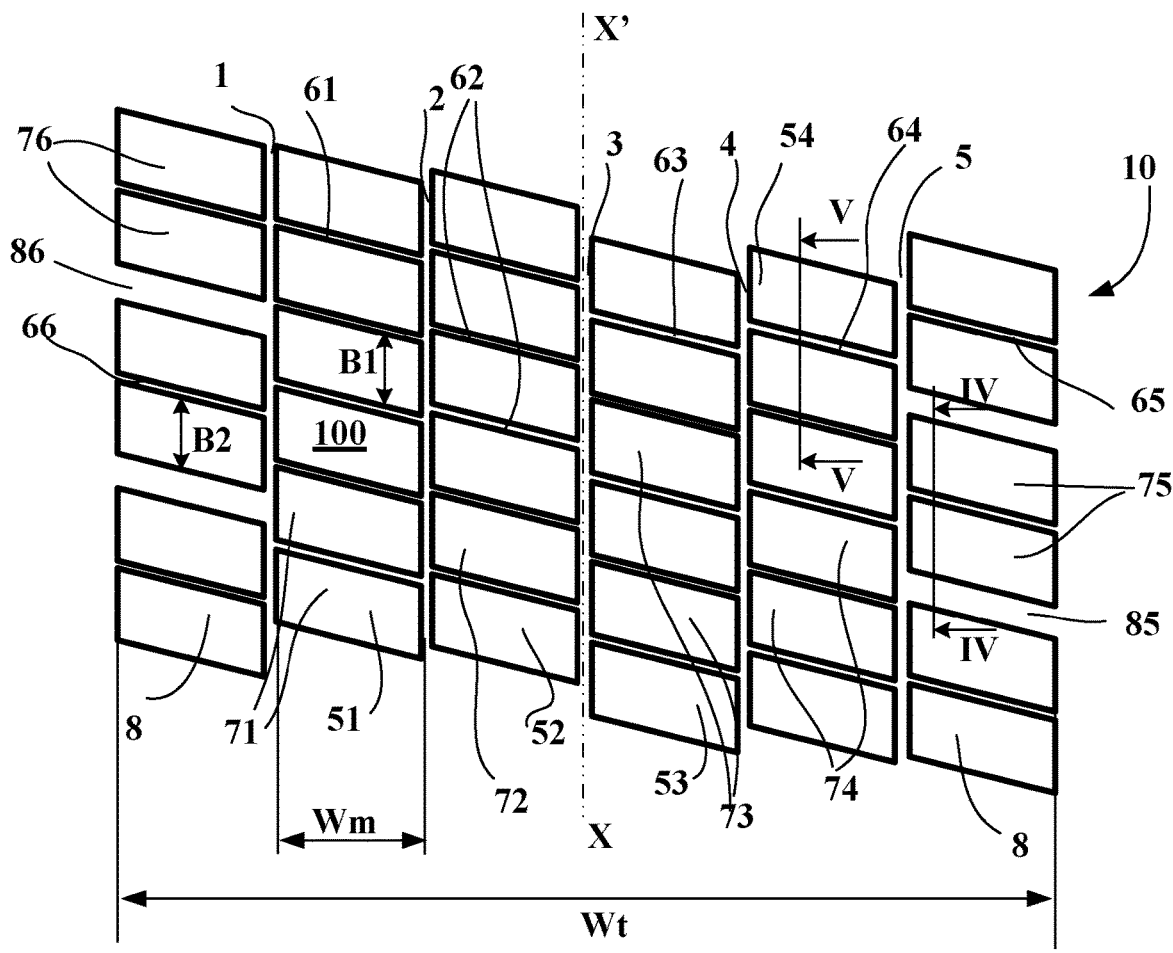
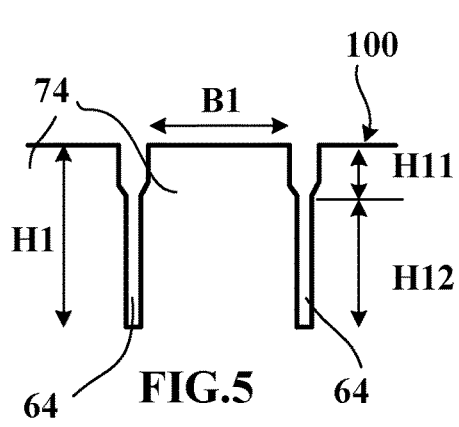
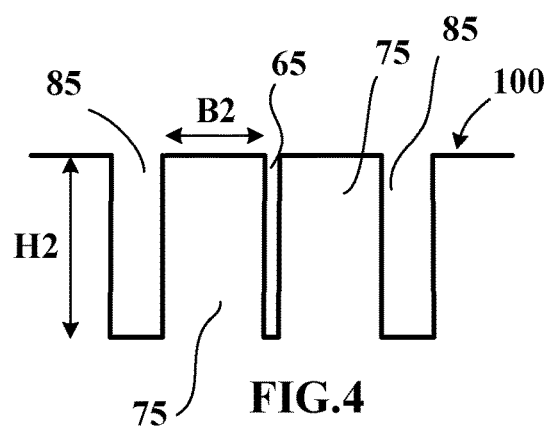
FIG.3
FIG.5
FIG.4

US 11,192,403 B2

SIPED TREAD FOR OFF-ROAD TIRE

RELATED APPLICATIONS

This is a U.S. National Phase Application under 35 USC 371 of International Application PCT/FR2017/050569 filed on Mar. 14, 2017.

This application claims the priority of French application no. 16/52623 filed Mar. 25, 2016, the entire content of which is hereby incorporated by reference.

FIELD OF THE INVENTION

The present invention relates to treads for tires for vehicles carrying heavy loads, such as off-road vehicles, the vehicles running over uneven ground such as in mines. This invention relates more particularly to the design of the tread pattern of such treads.

BACKGROUND OF THE INVENTION

In order to ensure satisfactory grip, in traction and braking, it is necessary to form a pattern in a tread, using a fairly complex system of grooves. These grooves form a tread pattern design both on the surface referred to as the tread surface which is intended to come into contact with the ground, and within the thickness of the tread.

The patent application published under number WO 2015/197429A1 shows a tire having a very wide tread suited to intensive use comprising laden cycles and unladen cycles. This tread comprises a central region and edges, the edges being separated from the central region by two circumferential grooves. The central region is cut into blades of material by a plurality of transverse or oblique grooves, each blade of material having a height at least equal to half the circumferential length of these blades of material and at most equal to 2.5 times this same length. Documents EP 2952362 A1 and EP0668173 A1 form part of the prior art which may be of use in understanding the invention.

Under certain conditions of use, the tires of civil engineering works vehicles are twinned on a rear axle. Given their large dimensions, and particularly the great width of their tread and the relatively small radii of gyration (compatible with those found on heavy goods vehicles), it is found that the tires of civil engineering works vehicles, when twinned, experience very high stress loadings when the vehicle on which they are mounted is performing cornering manoeuvres. It should be pointed out that this type of manoeuvre is very commonplace on these vehicles, whether unladen or fully laden, and has a significant impact on wear (both in terms of the evenness of the wear and in terms of the wear rate).

There has arisen a need to improve the wearing performance of the treads of the tires of civil engineering works vehicles when twinned on a driven axle while at the same time encouraging good flattening of the tire reinforcing structure, this reinforcing structure comprising, radially beneath the tread, a plurality of layers of material which are reinforced by cords oriented in appropriate directions.

Definitions:

In the present document, a radial direction means a direction which is perpendicular to the axis of rotation of the tire (this direction corresponds to the direction of the thickness of the tread).

Radial plane: a plane containing the axis of rotation of the tire.

Equatorial median plane: a plane which is perpendicular to the axis of rotation of the tire and divides the tire into two equal halves.

A transverse or axial direction means a direction parallel to the axis of rotation of the tire.

A circumferential direction means a direction tangential to any circle centred on the axis of rotation. This direction is perpendicular both to the axial direction and to a radial direction.

A rib is a raised material element formed on a tread, this material element extending in the circumferential direction and generally making a circuit of the tire. A rib comprises two lateral walls and a contact face, the latter forming part of the tread surface of the tread to come into contact with the road surface during running.

In this document, the grooves are spaces, created during moulding, between facing walls of material, these walls being connected together by a groove bottom. These grooves may have different widths and depths A tread has a maximum thickness Ht of material that can be worn away during running. Once this maximum thickness has been reached, the tire can be replaced with a new tire, or re-treaded, which means to say provided with a new tread. The volume of material that can be worn away corresponds, for the tires of the invention, to the quantity of material situated between the tread surface when new and a virtual surface parallel to the tread surface when new and passing through the innermost points of the grooves formed in the tread.

The surface voids ratio of a tread pattern is equal to the ratio between the surface area of the voids formed by the grooves and the total surface area (the contact area of the raised elements and the surface area of the voids). A low voids ratio indicates a large area of contact of the raised elements and a small surface area of voids between these elements.

The volume voids ratio of a tread pattern of a tread when new is equal to the ratio between the volume of the grooves formed in the tread and the total volume of the said tread comprised of the volume of material that can be worn away and the volume of the grooves. A low volume voids ratio indicates a small volume of voids relative to the volume of tread material that can be worn away. Likewise, it is possible to define a volume ratio for a region of a tread, this region being delineated axially.

The usual running conditions of the tire or use conditions are those which are defined notably by the E.T.R.T.O. standard, for use in Europe or any equivalent standard depending on the country in question; these use conditions specify the reference inflation pressure corresponding to the load-bearing capability of the tire as indicated by its load index and speed rating. These use conditions may also be referred to as "nominal conditions" or "working conditions".

SUMMARY OF THE INVENTION

One object of the present invention is to provide a tread for a tire for off-road vehicles carrying very heavy loads and running in mines over uneven ground which may be particularly harsh on the tires. The tread according to the invention is provided with a tread pattern that allows both an improvement in wearing performance while at the same time maintaining suitable grip, and doing so whatever the degree of wear of this tread. This invention is more particularly applicable to very wide treads, namely those with a width at least equal to 600 mm, intended for tires used at least in part twinned and on a rear axle of an off-road vehicle such as a civil engineering works vehicle.

Remember that the use of these civil engineering works vehicles is particularly sharply contrasted in terms of the load borne by each of its tires: fully-laden outbound journey, followed by an unladen return journey. During phases of running unladen, the load borne by each tire of the rear axle is approximately one third of the load borne during a phase of fully-laden running. Furthermore, during phases of running unladen, it is found that the load applied by the ground to the width of the tread is distributed very differently (in particular, a more pronounced reduction in the shoulder regions of the tire may be noted).

For this reason, one aspect of the invention is directed to a tread for a tire for an off-road vehicle carrying very heavy loads and intended to be twinned with another tire of the same structure for at least part of its use on a rear axle. This tread has a total width Wt greater than 600 mm and a thickness Ht of material to be worn away, this tread being provided with at least three main grooves of circumferential overall orientation and with a depth at least equal to 60 mm. These main grooves divide the tread into intermediate ribs and edge ribs, the edge ribs axially abounding the tread and having a width at most equal to one quarter of the total width Wt of the tread.

At least some of the intermediate ribs are provided with a plurality of fine grooves of depth H1 and delimiting blades of material of mean width B1 less than twice the depth H1. These fine grooves are oriented in the transverse direction corresponding to the axial direction of the tire or in an oblique direction (which means to say at an orientation that makes an angle at most equal to 45 degrees with the transverse or axial direction of the tire).

This tread is characterized in that each intermediate rib has a mean width which is at most equal to one quarter of the total width Wt of the tread and is at least equal to 0.75 times the thickness Ht of material to be worn away. Furthermore, the fine grooves have, over a height H12 at least equal to 65% of their total depth H1, a width which is at most equal to the value obtained from the following mathematical expression: $0.04\sqrt{B1 \cdot H1}$ (Four percent of the square root of the product B1 times H1).

For preference, the angle of the fine grooves is at most equal to 20 degrees.

Document WO 2015/197429A1 in particular discloses that fine grooves that satisfy the relationship whereby the depth H1 is at least equal to 0.5 times the width B1 of the blades of material delimited by the fine grooves have a favourable effect on the wearing performance of the tires subjected to driving torques. In the case of corners with low turning-circle radius, the loads applied by the ground to the tread in the direction of forward travel may be very high, thereby resulting in greater shear stresses on the blades of material under cornering than when imparting driving torque, particularly engine torque.

Because of the condition imposed on the maximum width of the fine grooves, it is possible to generate a very high contact pressure between the walls delimiting the fine grooves, thereby making it possible to lessen the drop in tread stiffness occasioned by the very presence of these fine grooves, by causing facing walls to mechanically interlock in order to limit slippage between said walls as far as possible.

The limit on the width of the ribs is essential so that the amplitude of variation of load over the width of each blade of material is limited in corners with a very low turning-circle radius.

For preference, the intermediate ribs provided with fine grooves are such that the circumferential length B1 between two fine grooves is at most equal to the depth H1 and at least equal to 0.4 times this same depth H1.

For preference, each main circumferential groove has a width at least equal to 6% of the depth of the groove and suitable for closing up when it enters the contact patch in which it is in contact with the ground so as to generate contact pressures between the facing walls. More preferably still, the width of each longitudinal groove is at most equal to 15% of its depth.

For preference, the depth H1 of the fine grooves is equal or similar to the depth of the circumferential main grooves.

As is known and in order to further limit the drop in tread stiffness occasioned by the presence of this plurality of fine grooves, it is sensible to make provision for at least some of the fine grooves to further comprise means for blocking relative movements of the facing walls that delimit these fine grooves. These blocking means are of even greater benefit when the ratio B1/H1 decreases and when, according to usage, the coefficient of friction between the walls of the fine grooves may decrease as a result of the presence of foreign bodies.

In an alternative form of the invention, the edge ribs axially delimiting the tread may be provided with a plurality of wide grooves and/or of fine grooves of mean depth H2 delimiting blocks of mean width B2, the depth H2 being less than 1.2 times B2. What is meant by a fine groove is a groove of which the mean width is less than the value of the expression: $0.04\sqrt{B2 \cdot H2}$ In another alternative form, the tread may comprise, among the intermediate ribs, at least one rib that does not have any fine groove.

Likewise, a tread according to the invention may comprise, among the intermediate ribs, at least one rib provided with wide grooves oriented transversely or obliquely.

In an alternative form of the invention, the fine grooves may have widths that vary between the tread surface when new and the bottom of these grooves, respecting, between the tread surface and the bottom, the mathematical relationship: $0.04\sqrt{B1 \cdot H1}$.

For preference, the fine grooves have an orientation that makes an angle at most equal to 20 degrees with the transversal axial direction of the tire, so as to be more effective in terms of wear.

In another advantageous alternative form, the depth H1 of the fine grooves in the intermediate zone is less than the depth of the grooves in the edge zone with a view to obtaining a good compromise between the heating-up of the edge regions and resistance to attack in the central region.

The value of B1 may be substantially similar for all the intermediate grooves, or may vary from one intermediate groove to another. In particular, it may be advantageous to have a higher H1/B1 ratio for the ribs closest to the equatorial median plane when there are at least three intermediate ribs.

The invention is used in tires for vehicles carrying heavy loads such as vehicles intended for off-road use, which means to say use outside of the road network, notably in mines.

Further features and advantages of the invention will become apparent from the following description with reference to the appended drawings which show, by way of non-limiting examples, embodiments of the subject matter of the invention.

BRIEF DESCRIPTION OF THE FIGURES

FIG. 3 shows a partial view of the tread surface of a tread according to another alternative form of the invention, which has undergone testing;

FIG. 4 shows a view in section on a plane of which the line in FIG. 3 is indicated by the line IV-IV;

FIG. 5 shows a view in section on a plane of which the line in FIG. 3 is indicated by the line V-V.

DETAILED DESCRIPTION OF THE FIGURES

To make the figures easier to understand, identical reference signs have been used in the description of alternative forms of embodiment of the invention where these reference signs refer to elements of the same kind, whether in terms of structure or function.

Of course, the figures serve to support the description without, however, claiming to show the alternative forms of embodiment to any particular scale.

Figure 1:
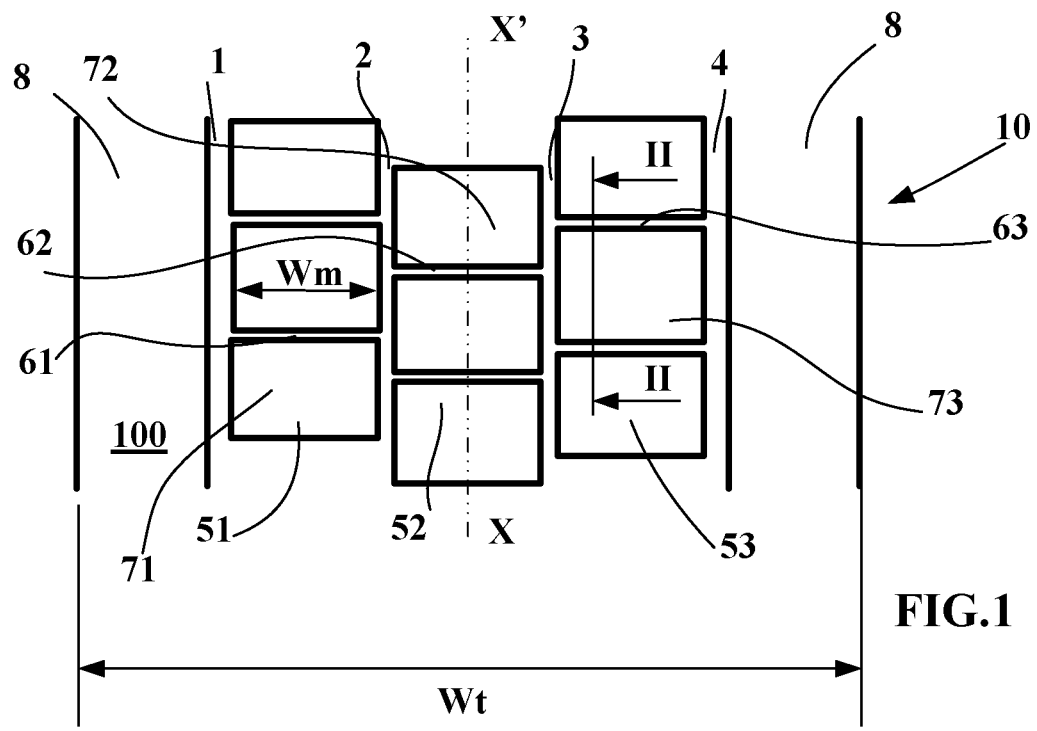
FIG. 1 shows a partial view of the tread surface of a tread of a tire according to the invention.

FIG. 1 shows a partial view of a tread 10 of a tire according to the invention intended in a first phase to be fitted to the front axle of an off-road vehicle of the "dumper" type, in order to carry very heavy loads and then in a second phase to be fitted to the rear axle of a similar vehicle. This radial tire of size 40.00 R 57 comprises a tread 10 intended to make the connection between the tire and the ground on which the vehicle is running.

This tread 10 has a total width W greater than 600 mm and has a tread surface 100 intended to come into contact with the ground. This tread has a total thickness Ht of material to be worn away, which is at least equal to 60 mm.

This tread 10 comprises four circumferential main grooves 1, 2, 3, 4 of mean width at least equal to 6 mm on the tread surface of the tire when new and of a depth at most equal to the thickness of material to be worn away.

These circumferential main grooves 1, 2, 3, 4 are arranged symmetrically with respect to the equatorial median plane identified by the line XX' in FIG. 1.

These four main grooves 1, 2, 3, 4 delimit three intermediate ribs 51, 52, 53 and two edge ribs 8 axially delineating the tread.

The three intermediate ribs have the same width which is less than one quarter of the total width of the tread. Each of these three ribs is provided with a plurality of fine grooves, respectively 61, 62, 63, these fine grooves being oriented in the transverse direction perpendicular to the circumferential direction and therefore parallel to the direction of the axis of rotation of the tire provided with this tread. Each fine transverse groove 61, 62, 63 opens on each side into a circumferential main groove. Furthermore, these transverse fine grooves are offset from one another in the circumferential direction from one row to another.

These fine transverse grooves 61, 62, 63 with the circumferential main grooves delimit, within each circumferential row 51, 52, 53, a plurality of material elements or blades 71, 72, 73 respectively, the mean height of which corresponds to the mean depth H1 of the said fine grooves.

Furthermore, the width of intermediate ribs provided with fine grooves is at least equal to 0.75 times of the thickness of material to be worn away Ht.

The width B1 is defined as being less than the depth H1 of the fine grooves. In this alternative form of embodiment, the widths of the fine grooves have widths at most equal to the value of the mathematical expression: $0.04\sqrt{B1 \cdot H1}$.

Axially on the outside the edge ribs are circumferentially continuous and have no grooves.

Figure 2:
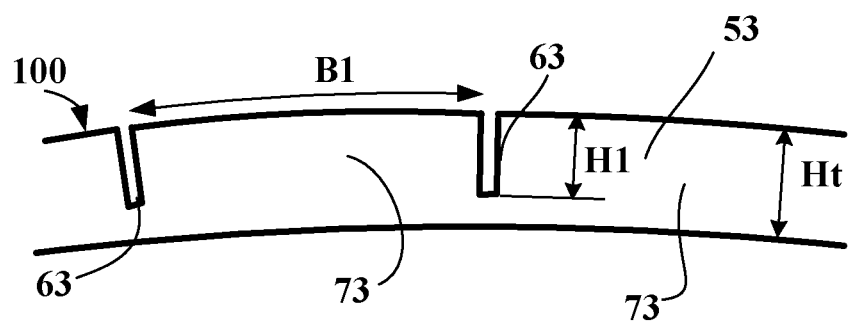
FIG. 2 shows a cross section, in a radial plane, of the tread shown in FIG. 1.

In FIG. 2, which shows a partial view in cross section on a radial plane, this section being indicated by its line II-II in FIG. 1, the distribution of the fine grooves 63 formed in the circumferential rib 53 can be seen.

These fine grooves 63 delimit, with the main grooves 3 and 4, a plurality of material elements 73 having a height equal to the depth H1 of the sipes and a circumferential length B1 on the tread surface 100. In the alternative form described, the other fine transverse grooves 61, 62 have the same dimensional characteristics, although of course a person skilled in the art may create variations on these characteristics according to the desired objective.

Under conditions of use it is found that the fine grooves partially close up when they enter the contact patch in which they are in contact with the ground; contact between the facing walls of the fine grooves affects approximately at least 65% of the surface area of the said walls (which means to say that there is contact over at least 65%).

FIG. 3 shows another alternative form of tread according to the invention, which has undergone testing. This tread 10 for a radial tire of size 40.00 R 57 is intended in a first phase to be fitted to the front axle of an off-road vehicle of the "dumper" type, in order to carry very heavy loads and then in a second phase to be fitted to the rear axle of a similar vehicle.

This tread has a total width Wt equal to 999 mm and is intended to come into contact with the ground via a tread surface 100 during running.

This tread 10 comprises five circumferential main grooves 1, 2, 3, 4, 5 of mean width equal to 8 mm with the exception of the groove in the central position, which has a mean width equal to 10 mm when new. These main grooves have a depth equal to 102 mm with the exception of the axially outermost main grooves which have a depth equal to 108 mm. These main grooves have widths suited both to closing up and generating contact pressures between their facing walls when they enter the contact patch, while at the same time allowing sufficient dissipation of heat when not in the contact patch.

These circumferential main grooves 1, 2, 3, 4, 5 generate four intermediate ribs and two edge ribs, these edge ribs axially delineating the tread in the width direction. The edge ribs have a mean width equal to 135 mm whereas the intermediate ribs have a mean width equal to 172 mm in the case of those closest to the edge ribs and 174 mm in the case of the ribs closest to the equatorial median plane, of which the line in the figure is indicated by the line XX'.

Each intermediate rib is provided with a plurality of fine grooves 2.5 mm in width, extending into the thickness of the tread over a height H1. These small-width fine grooves are oriented obliquely, which means to say in a direction that makes an angle of 15 degrees to the axis of rotation of the tire. These fine grooves together with the circumferential main grooves delimit a plurality of blades of material of which the mean width B1 measured in the circumferential direction is equal to the mean height of the blades. This mean height corresponds to the mean depth of said fine grooves.

In this alternative form, all the intermediate ribs are divided up in the same way into material elements the circumferential width B1 of which is equal to 60 mm and the height H1 of which is equal to 101 mm.

As can be seen in FIG. 5 which shows a cross section on a plane the line of which is along the line V-V in FIG. 3, the fine grooves comprise a part of height H12 equal to 71 mm over which their width is 2.5 mm, and to complement that, a wider part of height H11 equal to 30 mm. Over this wider part near the tread surface when new, the width does not satisfy the relationship $0.04\sqrt{B1 \cdot H1}$ In the alternative form described, all the material blades of an intermediate rib have the same circumferential length B1 and the same is true of the other intermediate ribs. Of course the invention described here encompasses alternative forms in which the circumferential lengths B1 of the material blades may be different, whether this be on the one same rib or between different ribs, while at the same time satisfying the relationship imposed by the invention, namely that, for each intermediate rib, the width of the fine grooves is less than $0.04\sqrt{B1 \cdot H1}$ In this alternative form shown in FIG. 3, each edge rib is provided with a plurality of wide grooves of mean width 45 mm and having the same depth as the circumferential main grooves separating the edges of the intermediate grooves, namely 108 mm. Alternating with these wide grooves there is provision to have narrow grooves of width 2.5 mm. FIG. 4 shows a cross section on a plane of which the line in FIG. 3 is embodied by the line IV-IV.

Thanks to this structure, the tire exhibits a wearing performance that is significantly improved both in a straight line and on cornering, while at the same time maintaining thermal and grip performance equivalent to the control tire, this being regardless of the state of wear of the tread.

The invention which has been described with the aid of these two alternative forms is not intended to be limited to only these examples and various modifications can be made thereto without departing from the scope as defined by the claims.

The invention claimed is:

1. A tread for a tire of an off-road vehicle carrying heavy loads, the tread having a total width Wt greater than 600 mm and a thickness Ht of material to be worn away, the tread having at least three main grooves of circumferential overall orientation and with a depth at least equal to 60 mm, said main grooves dividing the tread into intermediate ribs and edge ribs, the edge ribs axially bounding the tread and having a width at most equal to one quarter of the total width Wt of the tread, at least one of the intermediate ribs having a plurality of fine grooves; each said fine groove opens into a main groove and has a depth H1, said fine grooves, with the main grooves, delimiting blades of material of mean width B1 less than twice the depth H1, said fine grooves being oriented in the transverse direction corresponding to the axial direction of the tire or in an oblique direction, namely with an orientation that makes an angle at most equal to 45 degrees with the transverse or axial direction of the tire, wherein each said intermediate rib has a mean width at most equal to one quarter of the total width Wt of the tread and at least equal to 0.75 times the thickness Ht of material to be worn away, and wherein the fine grooves have, over a height H12 at least equal to 65% of their total depth H1, a width which is at most equal to the value obtained from the following mathematical expression: $0.04\sqrt{B1 \cdot H1}$ and have, over a height H11 radially outer from the radially outermost portion having the height H12, a wider part, wherein each edge rib comprises alternating wide grooves and fine grooves, each oriented in the transverse direction, and wherein all of the at least one of the intermediate ribs having the plurality of fine grooves has exclusively fine grooves, said fine grooves being rectilinear grooves.

2. The tread according to claim 1, wherein the angle of the fine grooves is at most equal to 20 degrees with respect to the transverse direction.

3. The tread according to claim 1, wherein the intermediate ribs provided with fine grooves are such that a circumferential length B1 between two said fine grooves is at most equal to the depth H1 and at least equal to 0.4 times this same depth H1.

4. The tread according to claim 1, wherein each said circumferential main groove has a width at least equal to 6% of its depth so as to be able to close up when it enters the contact patch in which it is in contact with the ground and generate contact pressures between the opposing walls.

5. The tread according to claim 4, wherein each said circumferential main groove has a width at most equal to 15% of its depth.

6. The tread according to claim 1, wherein the depth H1 of the fine grooves is equal to the depth of the circumferential main grooves.

7. The tread according to claim 1, wherein at least one of said intermediate ribs has no fine groove.

8. The tread according to claim 1, wherein at least one of said intermediate ribs is provided with wide grooves oriented transversely or obliquely.

9. The tread according to claim 1, wherein all of the intermediate ribs are provided with fine grooves.

10. A tread for a tire of an off-road vehicle carrying heavy loads, the tread having a total width Wt greater than 600 mm and a thickness Ht of material to be worn away, the tread having at least three main grooves of circumferential overall orientation and with a depth at least equal to 60 mm, said main grooves dividing the tread into intermediate ribs and edge ribs, the edge ribs axially bounding the tread and having a width at most equal to one quarter of the total width Wt of the tread, at least one of the intermediate ribs having a plurality of fine grooves; each said fine groove opens into a main groove and has a depth H1, said fine grooves, with the main grooves, delimiting blades of material of mean width B1 less than twice the depth H1, said fine grooves being oriented in the transverse direction corresponding to the axial direction of the tire or in an oblique direction, namely with an orientation that makes an angle at most equal to 45 degrees with the transverse or axial direction of the tire, wherein each said intermediate rib has a mean width at most equal to one quarter of the total width Wt of the tread and at least equal to 0.75 times the thickness Ht of material to be worn away, and wherein the fine grooves have, over a height H12 at least equal to 65% of their total depth H1, a width which is at most equal to the value obtained from the following mathematical expression: $0.04\sqrt{B1 \cdot H1}$ and have, over a height H11 radially outer from the radially outermost portion having the height H12, a wider part, wherein each edge rib comprises alternating wide grooves and fine grooves, each oriented in the transverse direction, wherein all of the at least one of the intermediate ribs having the plurality of fine grooves has exclusively fine grooves, and wherein the alternating wide grooves and narrow fine grooves on the edge ribs each have a mean depth H2, and respectively delimit blocks of mean block width B2, the mean depth H2 being less than 1.2 times the mean block width B2, each said fine groove having a mean width which is less than the value of the expression: $0.04\sqrt{B2 \cdot H2}$.

* * * * *